FEEDTHROUGH ELIMINATION IN MAGNETIC TRANSDUCERS

Filed Oct. 6, 1966

INVENTORS
REX C. BRADFORD
RICHARD E. BRAUN

BY [signature]

ATTORNEY

United States Patent Office 3,479,662

Patented Nov. 18, 1969

3,479,662

FEEDTHROUGH ELIMINATION IN MAGNETIC TRANSDUCERS

Rex C. Bradford and Richard E. Braun, Boulder, Colo., assignors to International Business Machines Corporation, Armonk, N.Y., a corporation of New York Filed Oct. 6, 1966, Ser. No. 584,870
Int. Cl. G11b *5/00*
U.S. Cl. 340—174.1 10 Claims

ABSTRACT OF THE DISCLOSURE

A magnetic transducer in which feedthrough noise between heads thereof is reduced by providing means capable of producing a feedthrough cancelling field in the area of the working gaps of heads which are subject to feedthrough reception. The cancelling field is produced by the same energizations that produce feedthrough, but is arranged to have an opposing phase. In an embodiment of the invention, the center shield of the transducer is used as the cancelling field emitter and is driven by a winding coupled thereto and activated in response to activation of the writing head of the transducer.

The present invention relates to magnetic recording systems and more particularly to means for reducing interference between transducers in a system which performs concurrent writing and reading operations.

In computer associated magnetic recording systems which employ signal transducers to record and read information on a magnetic record member such as a magnetic tape, disc, drum or the like it is common practice to employ transducer arrangements having a multiplicity of recording and reading elements designed to provide concurrent recording and reading of information on the medium. For example, in a conventional digital magnetic tape recording system, a transducer assembly may include a number of writing elements or heads, each with a working gap for magnetizing the medium in accordance with information supplied to its energizing circuitry. These heads are positioned in side-by-side relation transversely of the direction of motion of the tape to write in plural information tracks. A like number of reading heads, also with working gaps are provided to read information from the several tracks. The reading and writing heads are spaced longitudinally; that is, in the direction of motion of the tape, and are operated concurrently with the writing heads for verifying and checking recorded information and/or for supplying information to a utilization device.

In current high speed, high density recording systems, the several reading and writing heads are closely spaced and, consequently, a substantial amount of interference exists between them. During writing operations, electromagnetic radiation produced by the writing heads is coupled into the read heads and causes spurious noise signals to be developed and passed along to the reading circuitry with proper information signals. In many current systems, these noise signals, commonly referred to as "feedthrough," can exceed the information signals in magnitude, and make reliable reading impossible.

The feedthrough problem is known and several techniques have been developed to reduce its effects. Substantial reduction is achieved by the provision of shielding between the writing and reading heads in the transducer assembly, in the form of high permeability material designed to provide a low reluctance diverting path for stray flux. The co-pending application, Ser. No. 390,043, filed Aug. 17, 1964, by C. H. Stapper and assigned to the assignee hereof (abandoned in favor of a continuation-in-part application, now U.S. Patent 3,432,839), discloses means for further reducing feedthrough by providing a conductive layer over the surface of the transducer assembly adjacent the recording medium, with openings large enough to expose the working gaps of the heads. This shielding provides a focusing effect on the electromagnetic radiation emitted from the write heads and eliminates much of the feedthrough, particularly the higher frequency components thereof.

The present invention has, as a principal object, the provision of means for further reducing feedthrough in a recording system of the type described.

An object of the invention is to reduce feedthrough in a system of the type described by providing a flux field in the area of the working gap of a read head which is substantially equal in amplitude and opposite in phase with the feedthrough field so as to effectively cancel it.

Another object is to provide, in a system which employs plural write heads and plural read heads, elimination of feedthrough from write heads aligned with certain information tracks to read heads aligned with other information tracks.

It is a particular object of the invention to reduce and eliminate the lower frequency components of feedthrough and, accordingly, this invention has application to transducer assemblies which employ the shielding mentioned hereinbefore.

Feedthrough reduction is achieved, in accordance with this invention, by the provision of a field producing means between a writing and a reading head, together with circuit means for energizing the field producing means in response to operation of the writing head with a signal having a shape and phase such that a field is produced in the area of the working gap of the read head substantially opposing and cancelling the feedthrough field.

It has been found that the center shield between the writing and reading heads provides an efficient field producing means and this invention contemplates the use of the center shield for this purpose. This configuration enjoys the advantage of simplicity and economy by providing a novel function for a part already present and avoiding the necessity of redesigning the transducer assembly.

The general concept of feedthrough reduction by opposition and cancellation has been proposed before. U.S. Patent 2,871,464, issued Jan. 27, 1959, to Wright et al., discloses a system for balancing feedthrough signals picked up by a read head from an associated write head by including a winding on the write head in circuit with the read head on the same information track which may be energized in response to operation of a write head to balance noise picked up by the read head. The present invention enjoys advantages over this approach in that it is effective to eliminate feedthrough produced by write heads aligned with tracks other than that one associated with a particular read head. Moreover, the present invention operates to neutralize feedthrough fields over the read heads so that no interference is present, rather than balancing signals in individual read heads after they have been induced therein.

The foregoing and other objects, features and advantages of the invention will be apparent from the following more particular description of preferred embodiments of the invention, as illustrated in the accompanying drawings.

Figure 1:
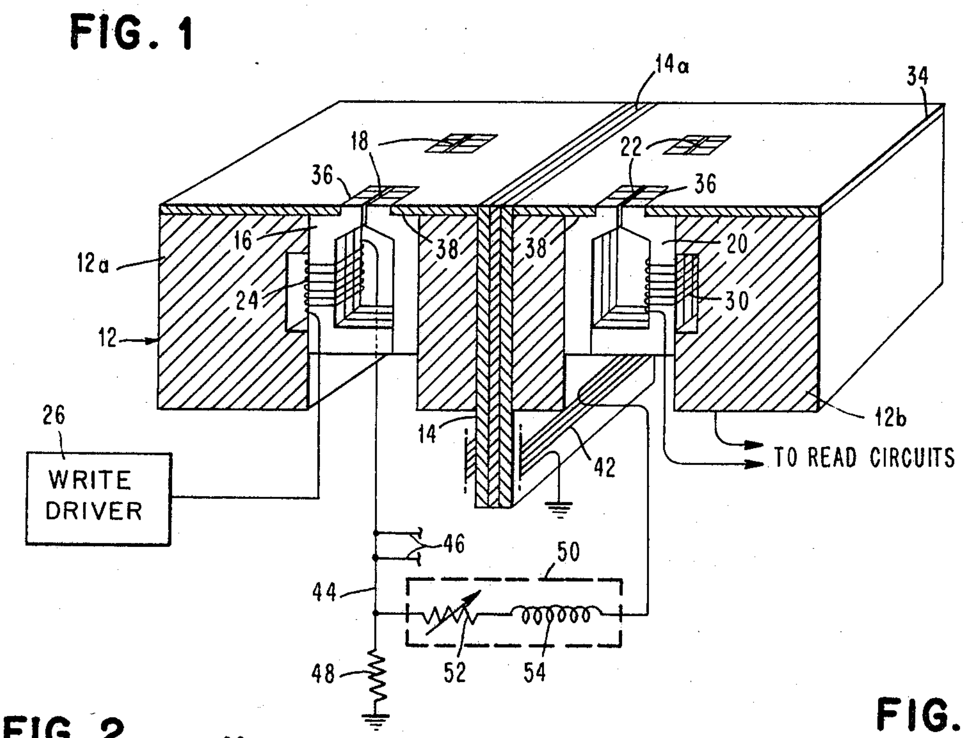
FIGURE 1 is a cross-sectional perspective view showing a typical transducer assembly embodying the invention.

Referring now in detail to the drawings, FIGURE 1 shows a typical multi-track transducer assembly embodying the present invention. The assembly comprises a non-magnetic housing 12, which may be of brass or another suitable non-magnetic material, and which supports the operative parts of the transducers. Housing 12 is divided into two sections **12*a* and 12*b* which are separated by a transverse shield member 14. The shield 14** is formed of a plurality of laminations of high permeability magnetic material, such as mu metal, separated by conductive layers; for example, copper. While only three laminations are shown in the drawing, it will be understood by those skilled in the art that many laminations may be provided in an actual device.

Each section **12*a* and 12*b* of the housing is constructed to support a plurality of magnetic transducing heads. A plurality of write heads 16 (which may be made of multiple laminations in accordance with standard techniques) are supported in housing section 12*a* with their working gaps 18 exposed at the surface of the assembly adjacent the record medium (not shown). The assembly has one write head 16 for each information track or channel on the medium and the heads 16 are arranged in spaced relation to accurately align with the information tracks. A like number of reading or verifying heads 20 are supported in the other section 12*b* of the housing, also with their working gaps 22 exposed at the operating surface of the assembly. The heads 20** are aligned longitudinally with the write heads so that information recorded on any track may be read as it passes over the read head associated with that information channel.

Figure 2:
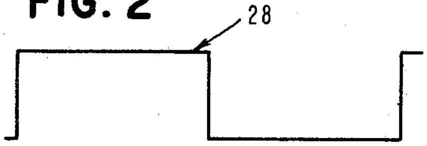
FIGURE 2 is an illustration of a typical waveform impressed on a write head to record information.

The write heads 16 are provided with excitation coils 24 (only one of which is shown in FIGURE 1) that are individually connected to write drivers 26 (again, only one shown). Information is recorded on a given track on the record medium by activation of the write driver 26 associated with that track to generate flux in the head 16. The flux in the working gap 18 magnetizes the medium in a pattern controlled by the strength and polarity of signals from the driver 26. A number of different recording techniques are known which use somewhat different magnetization patterns to represent digital information, and this invention is not limited to any particular technique. Generally speaking, all of these recording techniques employ rectangular waveforms, such as the one shown at 28 in FIGURE 2. Depending upon the technique employed and the information values recorded, the width, spacing and ground reference of these waveforms may vary. It is sufficient for the purposes of this description to consider the waveform without respect to these variations. The following discussion will consider the effects of the waveform 28 upon the elements of the assembly.

The read heads 20 have sensing coils 30 provided as shown in FIGURE 1 in which signals are developed by flux induced in the heads as magnetized areas of the record medium pass adjacent the working gaps 22. These signals are dependent upon the magnetization pattern on the track being read and are passed to read circuits (not shown) where their information content is detected.

Figure 3:
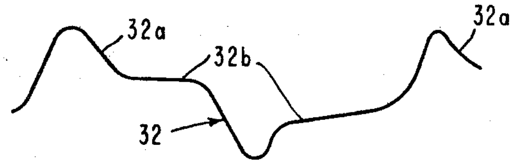
FIGURE 3 is an illustration of the waveform of a typical feedthrough signal in a multiple track transducer assembly.

As described hereinbefore, the stray electromagnetic radiation produced when a write head is activated to record information is coupled into the read heads of the assembly to produce unwanted noise signals. This radiation, or "feedthrough," interferes with the reading operation and tends to obscure the information being detected. FIGURE 3 shows, at 32, a feedthrough waveform which is induced in a read head 20 of the assembly in response to activation of a write head 16 with the recording waveform 28. The feedthrough waveform 30 is not illustrated in FIGURE 3 at the same scale as waveform 28, nor is the phase relationship accurately shown. Depending upon which of the several write heads is activated, the feedthrough at a particular read head will vary in strength. Phase difference also is a factor of spacing between the heads. The waveform 32 represents feedthrough without compensation or reduction by the shielding described in the co-pending application mentioned hereinbefore. It will be noted that the waveform is complex and contains high frequency components **32*a* and lower frequency components 32*b***. It has been found that as recording frequency increases, the magnitude of the entire waveform is increased and the high frequency components become more prominent.

It has been mentioned earlier herein that the provision of a conductive shield over the operating surface of the transducer assembly substantially attenuates feedthrough. Such a shield is shown at 34 in FIGURE 1. This shield 34 may be a thin layer of a conductive material such as copper or silver, plated or otherwise formed on the assembly. It is arranged to have openings 36 to expose the working gaps 18 and 22 of the transducing heads 16 and 20. These openings are made small by undercutting the pole faces of the heads as indicated at 38 so that the shield overlays a portion of each pole face while providing a continuous plane at the operating surface of the assembly.

Figure 4:
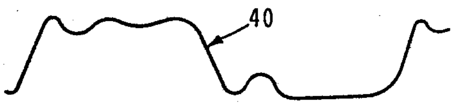
FIGURE 4 is an illustration of a feedthrough waveform in which high frequency components have been eliminated by shielding.

The shield 34 provides substantial focusing of the internal field emanating from the working gaps 18 and provides a substantial reduction in the feedthrough noise coupled to the read heads 20. The shield 34 is found to virtually eliminate the higher frequency components of the feedthrough signal and provides an overall reduction by a factor of about 10. FIGURE 4 shows a feedthrough waveform 40 attenuated by the shield 34. Again it should be noted that this waveform is not accurately scaled with respect to waveform 28. The waveform 40 is exaggerated with respect to waveform 30 to emphasize its shape. Comparison of the two feedthrough waveforms will show that the higher frequency feedthrough components have been substantially completely suppressed, leaving what is essentially a rectangular waveform of the same characteristics (e.g., width and spacing of transitions) as the recording signal 28, but with a phase displacement.

According to this invention, the feedthrough just described is attenuated, and substantially eliminated by providing in the area of the working gaps 22 of the read heads 20, a compensating field which opposes and cancels the feedthrough. This opposing field is produced by a radiating member interposed between the heads 16 and 20. The center shield of the head assembly provides a convenient and efficient device for this purpose, since it occupies the proper position and has an end portion **14*a*** which may be exposed at the operating surface of the assembly.

To adapt the center shield 14 to the purposes of this invention, the assembly is arranged so that the shield 14 is exposed with its end **14*a* coplanar with the surface of shield 34. An exciting coil 42 is provided on the shield 14 as shown in FIGURE 1 to induce flux in the shield. The coil 42 is energized through a circuit connected to the driving circuits for the write heads 16. Referring to FIGURE 1, it will be seen that each excitation coil 24 for a write head is connected at one end to its associated driver 26, and at the other end to a common line 44 leading to ground or the common reference for the write circuits. Only one coil 24 is illustrated in full in FIGURE 1; the ground side of the remaining coils are indicated by the connections at 46. There will be as many of these connections 46** as there are write heads in the assembly.

The common return line 44 is connected to the reference potential through a resistor 48, across which a potential is developed representing the combined signals supplied to the several write heads 16. Its form is controlled by the number of heads in operation and the phase relationship of their signals. Assuming that all heads in operation are supplied in the same phase with the signal 28 shown in FIGURE 2, the potential across resistor 48 will have the same waveform. If several heads are operating with different phases, the potential across resistor 48 will be more complex, but it will, nevertheless, have the same general waveform as the composite feedthrough from the recording heads 16. This potential, then, can be used effectively to eliminate the feedthrough.

Figure 5:
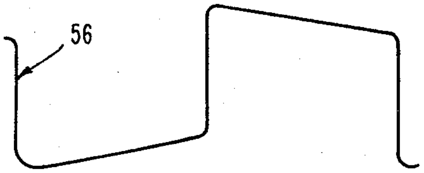
FIGURE 5 is an illustration of the waveform impressed across the windings of the feedthrough eliminating means of FIGURE 1.
Figure 6:
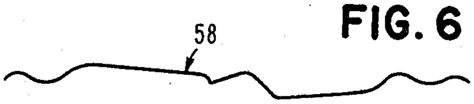
FIGURE 6 is an illustration of the feedthrough signal after reduction in accordance with this invention.

The feedthrough compensation coil 42 is connected across resistor 48 through a compensating network indicated at 50. The purpose of this network is to shape the signal applied to the coil 42 to conform to the feedthrough waveform. The compensating network of FIGURE 1 comprises an RL network having a variable resistor 52 and a reactance 54. By varying the resistance of the element 52 the time constant of the network, the waveform across coil 42 can be varied. FIGURE 5 shows at 56 the waveform across coil 42 after adjustment through network 50. The field produced by this compensating coil in conjunction with shield 14 closely matches the feedthrough field in magnitude, but due to the winding sense of the coils 42, is made to have an opposite phase, so that it neutralizes the feedthrough field. FIGURE 6 shows at 58 the feedthrough signal coupled into a read head after attenuation by the compensating field. Proper selection of the value of resistor 48 and adjustment of the time constant of network 50 will neutralize the feedthrough signal without providing a field sufficient to alter the information content of the record medium.

It has been found that feedthrough is reduced by the invention just described by a factor of about 10 in a typical case. It will be appreciated that, when coupled with the 10:1 reduction achieved by employing a conductive shield 34, a reduction of feedthrough in the order of 100:1 is achieved; thus virtually eliminating the problem and widening the other tolerances in the recording system.

Figure 7:
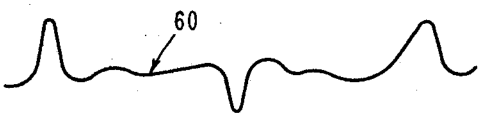
FIGURE 7 is an illustration of a feedthrough signal in a non-shielded transducer attenuated in accordance with this invention.

While the invention has thus far been described in connection with a transducer assembly having a conductive shield 34, it should be understood that it is by no means limited to such use. FIGURE 7 shows at 60 the feedthrough in a system using a transducer assembly such as that illustrated in FIGURE 1, but without the shield 34. It will be observed that the only feedthrough signal present after compensation is narrow spikes, and that a substantial reduction in noise is achieved.

By altering the circuitry of the compensating network, it is possible to eliminate these spikes as well as the low frequency components. For example, a plurality of parallel RL networks with varying time constants may be provided to construct the complex feedthrough waveform. The provision of such a network is within the purview of this invention; however, in actual practice it is found to be more practical to suppress the high frequency feedthrough components by shielding and to employ the relatively simple network 50 of FIGURE 1.

A distinct advantage of the present invention resides in the fact that the feedthrough elimination provided in accordance with the invention is effective to neutralize feedthrough across the entire operating surface of the transducer assembly, regardless of the head or heads from which it is emanating. Moreover, since the compensating coil is driven by a signal developed across the common resistor 48, which signal is a function of the number of heads recording information, automatic control is effected. The high feedthrough resulting when many heads are operating is met by a larger compensating field while feedthrough from a lesser number of heads is met by an appropriately reduced compensating field. Write heads operating in various phase relationships produce a composite signal across resistor 48 of the proper characteristics to develop a matching compensating field.

The transducer assembly shown in FIGURE 1 is but one design that may be used in conjunction with this invention and its specific design is not to be considered as limiting the invention. Transducer assemblies having simple or complex curvature of the operating surface may incorporate this invention with equal efficiency. The center shield used as a compensating field radiator need not have the specific construction shown in FIGURE 1. It is only necessary that the radiating member be positioned adjacent to and preferably between the writing and reading gaps, and that it include material having magnetic permeability sufficient for the purpose to which it is put in accordance with the teachings hereof. If it is a laminated structure, the laminations may extend longitudinally (i.e., each extending from the housing section 12*a* to the section 12*b*) rather than laterally as shown. It should also be understood that the invention is useful in assemblies that record on only one track and, accordingly, have only one group of read and write heads, as well as in multi-track assemblies.

While the invention has been particularly shown and described with reference to preferred embodiments thereof, it will be understood by those skilled in the art that various changes in form and details may be made therein without departing from the spirit and scope of the invention.

What is claimed is:

1. In a magnetic recording system which employs magnetic head members having working gaps therein for writing and reading information from a magnetic record medium moving adjacent said gaps, means for reducing the deleterious effects of feedthrough produced by a magnetic head operating to write on said medium in the area of the working gap of a magnetic head operating concurrently to read from the medium comprising:

(a) magnetic field producing means positioned adjacent said writing and reading heads; and (b) circuit means for energizing said field producing means in response to energization of said writing head, said circuit means including means for controlling said field producing means to supply a field in the area of the working gap of the reading head insufficient to materially alter information on said medium but of a strength and phase relationship to the field produced by said write head to oppose and substantially cancel said field in the area of the working gap of the reading head.

2. The invention defined in claim 1 wherein the writing and reading heads are spaced apart in the direction of movement of said medium and said field producing means extends transversely of said medium between said writing and reading heads.

3. The invention defined in claim 2 wherein the field producing means comprises a shield including magnetic material interposed between said writing and reading heads, and winding means on the shield.

4. The invention defined in claim 3 wherein the circuit means connecting the field producing means with the writing head includes a compensation network connected between the winding means on the shield and the writing head for shaping the waveform applied to the winding means to match the waveform of the feedthrough received by the reading head.

5. The invention defined in claim 4 wherein the compensating network includes at least one RL network.

6. In a magnetic recording system which employs a transducer assembly including a plurality of magnetic write heads having working gaps therein for simultaneously recording information on plural tracks of a moving recording medium, and including a plurality of read heads for simultaneously reading information from said plural tracks, each of said writing heads having energizing windings thereon and each of said reading heads having signal receiving windings thereon, the improvement in means for eliminating feedthrough from said write heads to said read heads comprising:

(a) field producing means supported in said transducer assembly adjacent said write and read heads, said means including a core of magnetic material and compensating winding means for inducing magnetic flux in said core which will emanate therefrom in the region of the read heads; and (b) circuit means connecting said compensating winding means in circuit with the energizing windings of all of said write heads with a relative polarity such that the field emanating from said field producing means opposes the feedthrough.

7. The invention defined in claim 6 wherein the circuit means (b) includes a common circuit point to which one end of each write head energizing winding is connected, the other end of each said energizing winding being connected to write driving means, impedance means connected to said common point in circuit with said write driving means, and means connecting said compensating winding means across said impedance means.

8. The invention defined in claim 7 wherein the means connecting the compensating winding means across the impedance means includes a compensating circuit having at least one RL network connected between the common point and the compensating winding means.

9. The invention defined in claim 8 wherein the transducer assembly includes a conductive shield over at least part of the surface thereof adjacent the record medium, and the compensating circuit consists of a single RL network connected between the common point and the compensating winding means.

10. The invention defined in claim 9 wherein the field producing means comprises a shield extending between the read and write heads transversely of the direction of motion of the record medium.

References Cited

UNITED STATES PATENTS

| | | | |
|---|---|---|---|
| 3,165,592 | 1/1965 | Brette | 340—174.1 |
| 3,187,111 | 6/1965 | Smaller | 340—174.1 |
| 3,249,928 | 5/1966 | Curtis et al. | 340—174.1 |
| 3,325,795 | 6/1967 | Mos | 340—174.1 |

STANLEY M. URYNOWICZ, Jr., Primary Examiner

V. P. CANNEY, Assistant Examiner

U.S. Cl. X.R.

179—100.2